Feb. 27, 1968
G. IPPOLITO ETAL
3,371,338
APPARATUS FOR CONTINUOUSLY DETECTING INCREMENTS
OF MOVEMENT OF A MOVABLE MEMBER BY MEANS OF
INSTANTANEOUS ANALOG-DIGITAL CONVERSION
Filed Aug. 25, 1964
2 Sheets-Sheet 1
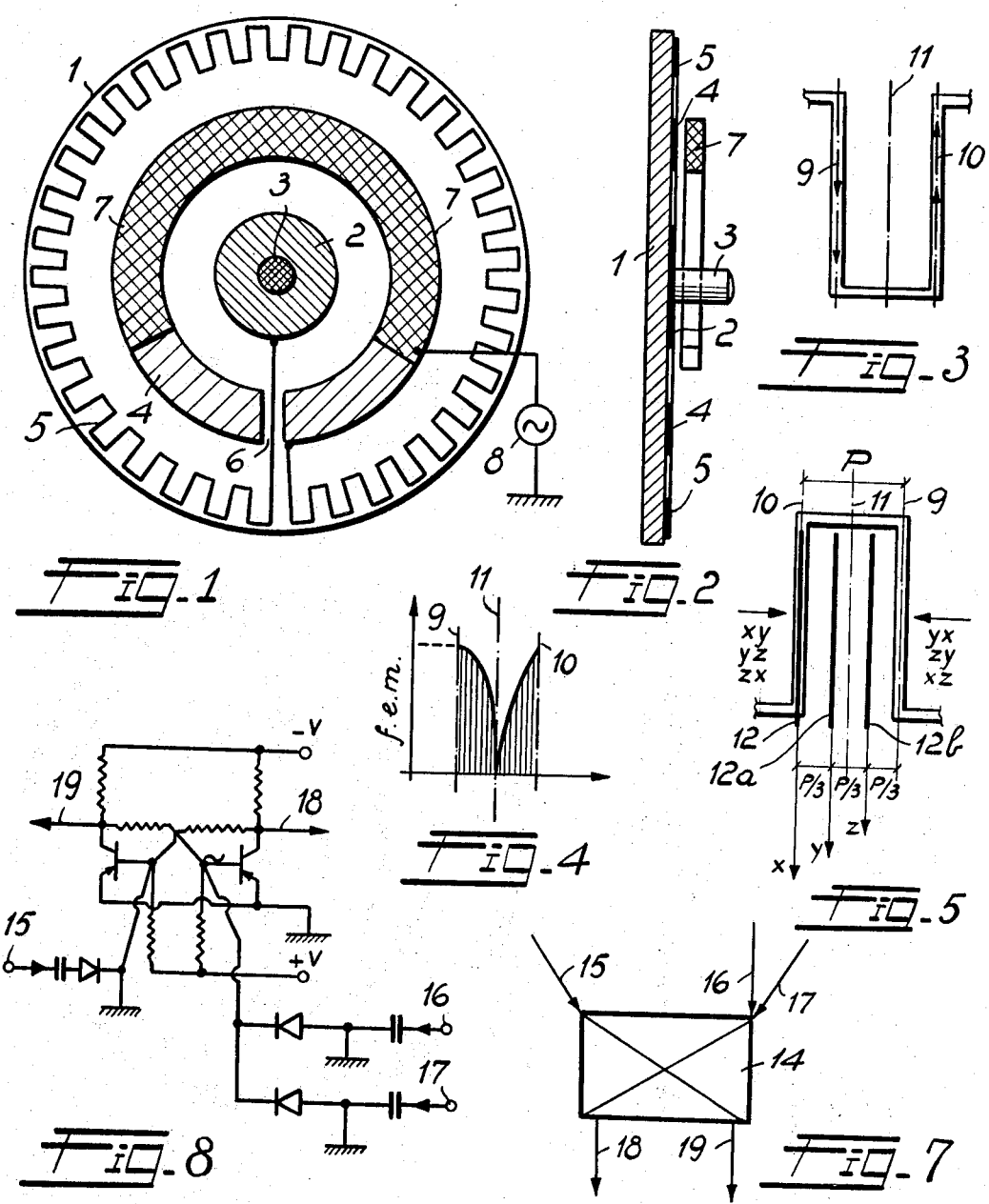
Giovanni Ippolito
Gianni Colombo
INVENTORS
BY
Agent

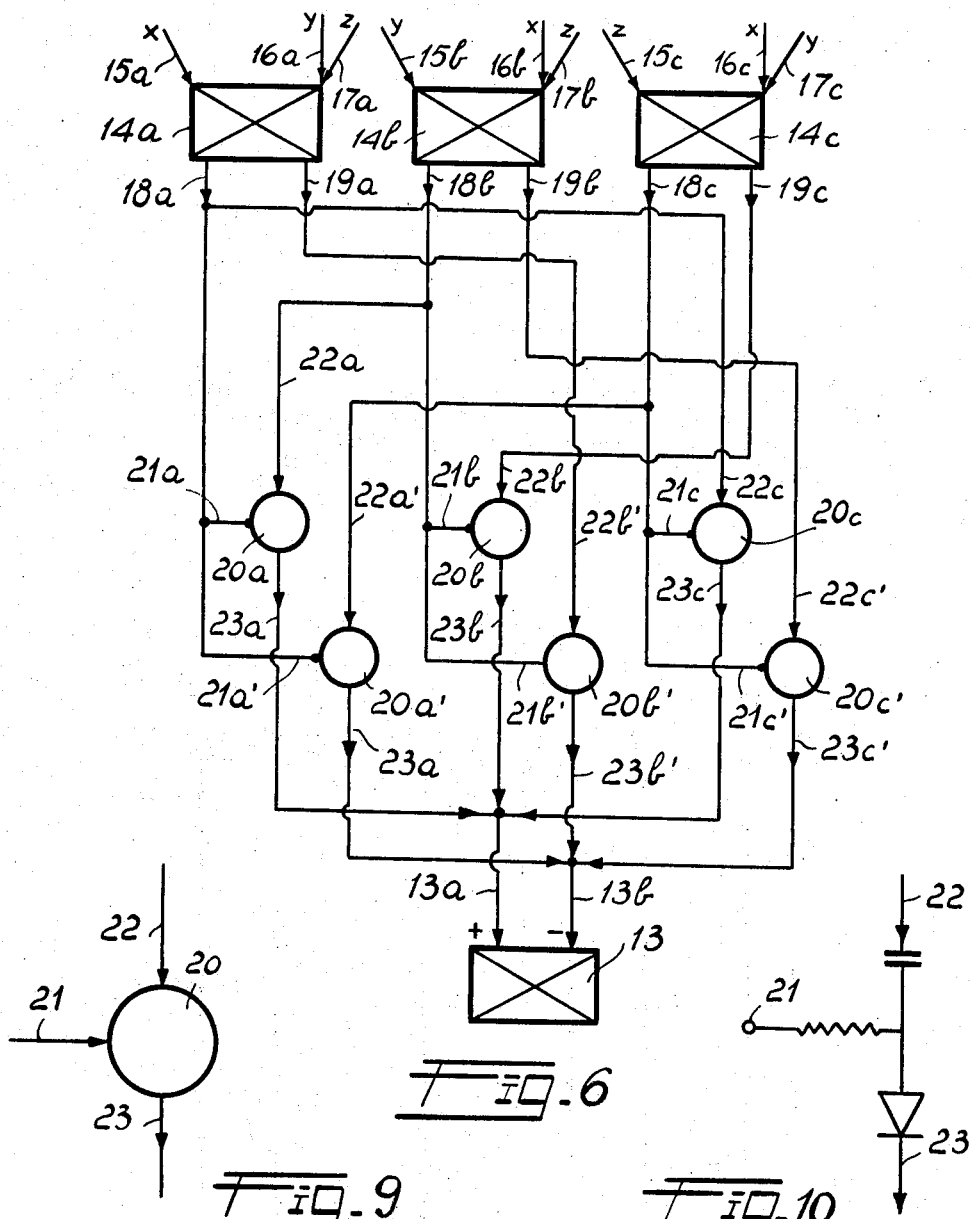

United States Patent Office 3,371,338
Patented Feb. 27, 1968

3,371,338
APPARATUS FOR CONTINUOUSLY DETECTING INCREMENTS OF MOVEMENT OF A MOVABLE MEMBER BY MEANS OF INSTANTANEOUS ANALOG-DIGITAL CONVERSION
Giovanni Ippolito and Gianni Colombo, both of Via per Castelletto, Borgo Ticino, Italy
Filed Aug. 25, 1964, Ser. No. 391,874
Claims priority, application Italy, Aug. 29, 1963, 17,786/63, Patent 703,990
10 Claims. (Cl. 340—347)

ABSTRACT OF THE DISCLOSURE

This invention relates to an apparatus for continuously detecting increments of movements of the indicating member of measuring instrument, comprising a movable plate of dielectric material, receiving movement from said indicating member and having a printed circuit including a fret ring. Spaced from said plate and arranged in a plane facing said printed circuit a stationary electrode member is arranged connected with an oscillating current supplying source and electrically cooperating with a portion of said printed circuit, thereby inducing a current flow in said fret ring. Provided in the vicinity of said fret ring are stationary detecting elements in the form of rod-like electrodes having pulse signals induced therein during rotation of said disc, which are delivered to storage members transmitting said pulse signals to a differential counter summing-up or subtracting the pulse signals depending on the signal sequence.

---

This invention relates to an apparatus for continuously detecting increments of movement of a movable member, particularly, but not exclusively of the indicating member of a measuring instrument and of scales with a rotating pointer in particular, by means of instantaneous analog-digital conversion.

The detecting of increments of movement, angular or rectilinear, of an indicating member particularly in measuring instruments is based nowadays on different so-called " "synchros" " systems, comprising substantially brush coders potentiometers, photo-electric or induction systems and the like. Such systems, as known, provide directly the indication of the position in numerical form, or by means of a subsequent conversion in digital data of a voltage or of a phase.

A main object of this invention is to provide an apparatus adapted to continuously detect increments of movement of a movable member, particularly of an indicating pointer of measuring instruments and of rotating pointer scale in particular, by means of instantaneous conversion of analog data into digital data.

Another object of this invention is to provide an apparatus of the described type by means of which it is possible to obtain precise indications with more decimals by means of a plurality of detecting channels.

Another object of the invention is to provide an apparatus adapted to attain the above mentioned objects by means of an equipment in which no friction and hence wear occurs, by excluding sliding electric connections between movable parts, with the possibility to reach, as a consequence, an indefinite number of movements with highest speeds as allowed mechanically, as well as with the possibility to use the apparatus in such cases in which passive resistances are not acceptable.

A further object of this invention is to provide such an apparatus in which the movable member is movable in two opposite directions and this makes the apparatus particularly suitable and interesting for the digital reading of the deviations of the rotating indicating pointer of scale.

A further and not least object of this invention is to provide an apparatus suitable to attain the previously mentioned objects with a highly reliable functioning by virtue of the great stability of the used elements and with a construction of competitive costs.

These and other objects are attained by the apparatus according to the invention, for the continuously detecting increments of movement of a movable member, particularly of the indicating member of measuring instruments or scales with a rotatable pointer in particular, which is characterized in that it comprises printed circuit means movable together with said movable member and co-operating with detecting means for detecting the position of said movable member, said detecting means being adapted to detect said positions by means of signals in the form of electric pulses, storage circuit and commutation means associated with said detecting means adapted to store said electric pulses, gate circuit means associated with said storage means, according to a preestablished sequence of said signals and differential counter means interlocked with said gate circuit means in such a way as to be actuated for summation and/or subtraction in the moment in which said preestablished signal sequence occurs in said gate circuit means through the said storage circuit and commutation means.

Advantageously, said position detecting means detecting the position of the movable member are of the type in which the signals are detected according to a pre-established code, said storage circuit and commutation means being of the type suitable to store said signals independently, according to said preestablished code and said gate circuit means, being associated with said independent storage means, according to a preestablished signal sequence of said preestablished code.

Further characteristics and advantages will appear from the following detailed description of a preferred but not exclusive embodiment of the apparatus according to the invention, shown by way of a non-limiting example in the attached drawing, in which:

FIGS. 1 and 2, show diagrammatically, in two mutually perpendicular views, the mechanical components for detecting the indications of a measuring instrument; having a rotating indicating member;

FIGS. 3, 4 and 5 show diagrams explaining the functioning of the part of the apparatus shown in the FIGS. 1 and 2;

FIG. 6 shows a diagram of the electronic part of the apparatus for the processing of the data detected by the apparatus part show nin the FIGS. 1 and 2;

FIGS. 7, 8, 9 and 10 show details of the part of the apparatus shown in FIG. 6.

With reference to such figures, it may be seen from FIGS. 1 and 2, that the mechanical part of the apparatus for detecting increments of movement of the movable part of a measuring instrument, which in this exemplificative embodiment shown in the accompanying drawings is of the type having a rotating indicating member such as a pointer of scales, comprises a movable plate-shaped supporting element in the form of a disc 1 of dielectric material on which a printed circuit of electrically conducting material is formed in any known manner, comprising a circular central zone 2 which serves for the ground connection and at the centre of which the shaft 3 is connected whereof the angular position has to be detected, a circular rim 4 coaxial and external to said central zone 2 and a circular rim 5, coaxial and external to said circular rim 4. Said circular rim 5 is in the form of a fret, connected electrically at one end with the circular rim 4 and by means of a printed wire-like connection passing through the gap 6 to the central circular zone 2 (see FIG. 1). In a position spaced from and facing the circular rim 4 there is provided an electric conductive means in the form of an electrode 7 (see FIGS. 1 and 2) which reproduces partially or completely the form of the rim 4 (in FIG. 1 exemplificatively corresponding to the part or zone having a double or cross-hatching). Such electrode 7 is electrically connected to an electric power supplying means in the form of an oscillator 8 the other terminal of which is grounded.

As clearly shown in FIG. 2 electrode 7 is spaced from disc 1.

As mentioned with regard to the objects of this invention the electrode 7 is stationary in order to avoid sliding contacts between it and oscillator 8.

According to a modification of the invention, the circular rim 2 may not be grounded so that the return connection of the oscillator is provided with a further stationary electrode, not represented, which faces said circular rim 2.

In this way, due to the capacity existing between the parts 4 and 7, the part 7 is at a different voltage than the central part 2. Due to the above said capacity effect, two adjacent sides of the fret 5 indicated generally with 9 and 10 (see FIG. 3) have at any moment currents of equal intensity, but opposite direction which run therethrough, so that the magnetic field which is generated by them is always nil at a plane perpendicular to the drawing and passing through the axis of symmetry 11 between said sides 9 and 10, while it is maximum and alternating with the working frequency in planes parallel to the previous one, and which pass through said sides 9 and 10. In this way, if a conductive element 12, 12a, 12b is passed parallel to and in the proximity of the sides or radial stretches 9 and 10, of fret 5 an electro-motive force is generated therein, which is alternating and has a form according to the diagram represented in FIG. 4. Such electro-motive force (EMF) when suitably amplified and rectified, provides a precise indication of the position of said conductive element with respect to all the sides 9 and 10 of the fret 5. In particular such an EMF is annulled, when the conductive element is in the plane of symmetry 11 between the sides 9 and 10. This indication of zero is absolutely independent from the value of the current in the fret 5, from the distance of the conductive element from the plane containing the sides 9 and 10 of said fret 5, from the amplification, from the oscillation frequency and from the relative speed of the conductive element with respect to said fret.

In the case of a rotating indicating member, such as that shown exemplificatively in FIGS. 1 and 2 of the attached drawing, in one revolution there is obtained a number of zeros equal to the number $n$ of couples formed by the sides 9 and 10 of the fret 5. The number $n$ of the zeros descriminated with known methods may be counted with methods also of known type, and in this way the angular position of the disc 1 may be furnished with a $1/n$ revolution resolution. In this way it is possible to detect the positions of a rotating member in a single direction. In order to determine the direction of rotation of the rotating member, with the consequent differential indication of the values of the positions of said rotating member, there is provided, according to this invention, a number of stationary detecting electrodes which is equal to or greater than three, indicated in FIG. 5 at 12, 12a, 12b in the case of the minimum number of three. Such detecting rod-like electrodes 12, 12a, 12b are put at distance $P/m$ between each other, wherein P represents the pitch of the fret 5 (see FIG. 5). In this way, it is possible not only to increase the angular resolution of the system from $1/n$ revolutions to $1/n.m$ revolutions, but also to detect the direction of rotation of the disc 1, and consequently to detect at any moment starting from an initial conventional condition, the angular position attained by any angle $n.360° + \alpha (n \geq 0)$ even if the disc attains such position by subsequent displacements or oscillations in the two directions.

In FIG. 6 there is represented a logic circuit adapted to obtain such result through a minimum number of three detecting elements 12, 12a, 12b.

In order to clarify the functioning of the above said logic circuit, aimed at obtaining the determination of the rotation direction of disc 1 with the consequent differential indication of the positions, the zero signals coming from the detecting elements 12, 12a, 12b are indicated conventionally with X–Y–Z, the sequences of the signals indicating the rotation of the disc 1 in one direction and which may, for example cause the counter 13 to summation count, are indicated with XY–YZ–ZX and the sequences of the signals indicating the rotation of the disc in the opposite direction with respect to the previous one and which should in this case cause the counter 13 to subtraction count, are indicated with YX–ZY–XZ. The above said logic circuit is realized with electronic component elements of known type, i.e., with electronic storage and commutation members of the binary type with flip-flop elements and with gate circuit elements of the AND type. As it is known, such electronic component elements or equipments allow high computing speeds. The storage member indicated generally at 14 comprises three inputs 15, 16, 17 associated with the detecting elements 12, 12a, 12b and two outputs 18, 19 associated with the gate circuits as indicated in the diagram of FIG. 6 according to the above said signal sequences. The AND gate circuit, indicated generally at 20, comprises a conditional input 21, a signal input 22 and a signal output 23. The input 15 of the storage member corresponds to the storage inputs of the signal (SET) while the input 16 and 17 correspond to the zeroing inputs (RESET). In the diagram of FIG. 6 three independent storage members 14, 14b, 14c are represented, six AND gate circuits, 20a–20a', 20b–20b', 20c–20c' and a differential counter 13 of known type with two inputs 13a and 13b for summation counting and subtraction counting, connected at the output of signals 23a–23b–23c and 23a'–23b' and 23c' of the said gate circuits 20a–20b–20c and 20a'–20b' and 20c'.

The functioning of the apparatus according to the invention and particularly of the electronic circuit represented in the FIG. 6 is as follows:

The signal X coming from the reading member 12 while entering through 15a activates the output 18a of the binary storage member 14a and at the same time, while entering through 16b and 16c puts in the opposite condition (zeroing) the storage members 14b and 14c. The pulse of the signal X, while coming through 18a at the inputs 21a and 21a' conditions the gates 20a and 20a' to pass a signal pulse at the corresponding signal input 22a and 22a'. If as signal Y follows the signal X during the rotation of disc 1, such pulse of signal Y while entering through 15b activates the output 18b of the storage member 14b and at the same time, while entering through member 16a and 17c zeros the storage members 14a and 14c. The signal pulse Y while arriving through 18b to the input 22a of the gate 20a conditioned by the previous pulse of the signal X through conditional input 21a, provokes a signal pulse at the output 23a, thereby determining the actuation of the counter 13, so as to cause the same to summation count through the corresponding input 13a. If a pulse of signal Z instead of a pulse of signal Y follows the pulse of signal X, said pulse of signal Z while entering through 15c activates the output 18c of the storage member 14c and at the same time, while entering through 17a and 17b zeros the storage members 14a and 14b. The pulse of the signal Z arriving through 18c at the input 22a' of the gate 20a', conditioned by the previous pulse of signal X through the conditioning input 21a', provokes a signal pulse at the output 23a' thereby determining the actuation of the counter 13 to subtraction count through the corresponding input 13b.

An analogous functioning is obtained also for the pulse of signal X depending on whether it is preceded by a pulse of signal Z or Y for the conditioning of the AND gates and so on.

It is to be understood that the above described embodiment is given only by way of example and it will be therefore appreciated that in practice modifications may be made without departing from the scope of the invention.

Thus, for example, if the disc 1 is given an infinite radius it will be evident that the entire system will be valid for the coding of rectilinear displacements instead of angular ones. Furthermore, if non-linear coding is desired it will be sufficient to design the fret 5 with a variable pitch in a manner to reproduce the required rule.

The energy transmission to the fret 5 may be made by means of a sliding contact or by means of induction, instead of the capacity. The reading may be made by means of the capacity thereby exploiting the electric field instead of the magnetic one. Instead of a single fret with a plurality of detecting elements a series of frets may be used with one detecting element for each fret; in such case frets may be made with pitches in conformity with a preestablished code and they may be detected by comparison with a synchronization fret. Finally, it is possible to use photo-electric or contact detecting elements or similar instead of the described fret system and the output thereof may be processed by using the above described logic cyclic system. Also the application of the apparatus in question may be different and besides the case of the scales with a rotating pointer as above described, it may be used for any measuring instrument having a rotating or rectilinearly displacing pointer, for position control systems in machine tools, for servo-steering of aeroplanes, ships or the like.

We claim:

1. An apparatus for continuously detecting increments of movement of a movable member, comprising a movable plate-shaped supporting element of dielectric material having a printed circuit thereon to provide a first electric conductive means, said supporting element being connected with said movable member to receive movement therefrom, a second electric conductive means spaced from said supporting element and adapted to electrically cooperate with said first electric conductive means; electric power supplying means to one of the first and second electric conductive means, stationary detecting means adapted to detect the increment of movement generating signal pulses in relation to the relative movement thereof with respect to said first electric conductive means on the supporting element, storage and commutation circuit means connected with the detecting means adapted to store the pulses, gate circuit means cooperating with the storage means according to a preestablished sequence of the pulses, and differential counter means interlocked with the gate circuit means in such a way as to be actuated for summation and/or subtraction when the preestablished sequence of pulses occurs in the gate circuit means through the storage and commutation circuit means.

2. An apparatus according to claim 1, in which the detecting means for detecting the increments of the movable member comprise means which in cooperation with the first and second electric conductive means generate signal pulses according to a preestablished core, the storage and commutation circuit means being of the type adapted to store the signals according to the preestablished code, the gate circuit means being associated with said storage means according to a preestablished sequence of signals of the preestablished code.

3. An apparatus according to claim 1 in which the second electric conductive means cooperate through capacity with the first electric conductive means.

4. An apparatus according to claim 1 in which the second electric conductive means cooperate through induction with the first electric conductive means.

5. An apparatus according to claim 1 in which the storage and commutation circuit means are of the binary type with flip-flop elements.

6. An apparatus according to claim 1 in which the gate circuit means are of the AND type.

7. An apparatus according to claim 1, in which the first electric conductive means comprise at least three zones substantially in the form of circular rims of electrically conductive material rigid with the supporting element of dielectric material, the conductive zones being interconnected electrically in series with one another.

8. An apparatus according to claim 7, in which one of the electrically conductive zones is shaped according to a design having one or more conductive elements with a fret-like development which is arranged to give rise to the preestablished code.

9. An apparatus for continually detecting increments of movement of a movable member, comprising a movable plate of dielectric material connected to said movable member and having a printed circuit thereon including a central disc-like zone, an annular zone concentric with and spaced from said disc-like zone and a ring coaxial with the disc-like zone and in the form of a fret made to correspond to a preestablished code, an end of said fret ring being electrically connected with the disc-like zone and its other end to the annular zone, and at least one electrode being provided spaced from said movable plate and arranged in a plane facing at least one among said disc-like zone and said annular zone, at least three stationary detecting rod-like electrodes provided in the vicinity of the ring, in a plane spaced from and facing said fret ring, storage and communication circuit means receiving pulse signals induced in said detecting electrodes and adapted to store said pulses, gate circuit means cooperating with the storage means according to a preestablished sequence of the pulses, and differential counter means interlocked with the gate circuit means in such a way as to be actuated for summation and/or subtraction when the preestablished sequence of pulses occurs in the gate circuit means through the storage and commutation circuit means.

10. An apparatus according to claim 9, wherein the movable member is a rotating pointer fixed on a shaft and said movable plate is a disc which receives movement from said shaft defining the center of the disc and wherein said fret ring has circumferentially spaced stretches extending substantially in a radial direction to said disc and wherein said stationary detecting rod-like electrodes extend substantially parallel to said stretches when in nearest position with respect to said detecting electrodes and wherein the distance between said detecting electrodes is less than the circumferential distance between said stretches.

References Cited

UNITED STATES PATENTS

| | | | |
|---|---|---|---|
| 3,218,635 | 11/1965 | Masur | 340—347 |
| 3,222,668 | 12/1965 | Lippel | 340—347 |
| 3,223,995 | 12/1965 | Brothman | 340—347 |
| 3,237,189 | 2/1966 | Wayman | 340—347 |
| 3,238,523 | 3/1966 | Masel et al. | 340—347 |
| 3,278,928 | 10/1966 | Loughlin et al. | 340—347 |
| 3,286,252 | 11/1966 | Bose et al. | 340—347 |

MAYNARD R. WILBUR, Primary Examiner.

DARYL W. COOK, Examiner.

W. J. KOPACZ, Assistant Examiner.